United States Patent
Kim et al.

(10) Patent No.: US 9,374,360 B2
(45) Date of Patent: Jun. 21, 2016

(54) SYSTEM AND METHOD FOR SINGLE-SIGN-ON IN VIRTUAL DESKTOP INFRASTRUCTURE ENVIRONMENT

(71) Applicant: SAMSUNG SDS CO., LTD., Seoul (KR)

(72) Inventors: Sundeuk Kim, Seoul (KR); Hyun Taek Oh, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 178 days.

(21) Appl. No.: 14/012,351

(22) Filed: Aug. 28, 2013

(65) Prior Publication Data

US 2014/0344910 A1   Nov. 20, 2014

(30) Foreign Application Priority Data

May 16, 2013   (KR) .................. 10-2013-0055633

(51) Int. Cl.
  *G06F 3/00* (2006.01)
  *H04L 29/06* (2006.01)

(52) U.S. Cl.
  CPC ........ *H04L 63/0815* (2013.01); *H04L 63/0823* (2013.01)

(58) Field of Classification Search
  USPC .................... 726/5, 8, 7, 9, 28; 713/168, 186; 715/221
  See application file for complete search history.

(56) References Cited

U.S. PATENT DOCUMENTS

| | | | | |
|---|---|---|---|---|
| 8,281,381 B2* | 10/2012 | Kranendonk | ....... | H04L 63/0815 726/8 |
| 2009/0177956 A1* | 7/2009 | Huang | .................. | G06F 17/243 715/221 |
| 2010/0306547 A1* | 12/2010 | Fallows | ................ | G06F 21/305 713/178 |
| 2011/0030044 A1* | 2/2011 | Kranendonk | ....... | H04L 63/0815 726/8 |
| 2011/0107409 A1* | 5/2011 | Wilkinson | ............ | G06F 21/335 726/8 |
| 2012/0036360 A1* | 2/2012 | Bassu | .................. | H04L 9/3228 713/168 |
| 2013/0212653 A1* | 8/2013 | Hoghaug | ................ | G06F 21/34 726/5 |
| 2013/0340063 A1* | 12/2013 | Larsson | ................ | G06F 21/335 726/9 |
| 2014/0330990 A1* | 11/2014 | Lang | ...................... | G06F 9/4555 710/14 |
| 2014/0331060 A1* | 11/2014 | Hayton | .................. | G06F 21/31 713/186 |
| 2014/0331297 A1* | 11/2014 | Innes | ...................... | H04L 63/08 726/7 |
| 2014/0331333 A1* | 11/2014 | Frost | ...................... | G06F 21/62 726/28 |

* cited by examiner

*Primary Examiner* — Joseph P Hirl
*Assistant Examiner* — Sayed Beheshti Shirazi
(74) *Attorney, Agent, or Firm* — Sughrue Mion, PLLC

(57) ABSTRACT

A system and a method for single-sign-on (SSO) in a virtual desktop infrastructure (VDI) environment are disclosed. The system includes a VDI service server configured to provide a virtual desktop environment to a user terminal according to a request from the user terminal, and a VDI authentication interworking gateway configured to receive VDI environment information of the user terminal from the VDI service server and carry out delegated user authentication for a target system in the virtual desktop environment using the VDI environment information.

17 Claims, 3 Drawing Sheets

SYSTEM AND METHOD FOR SINGLE-SIGN-ON IN VIRTUAL DESKTOP INFRASTRUCTURE ENVIRONMENT

CROSS-REFERENCE TO RELATED APPLICATION

This application claims priority to and the benefit of Republic of Korea Patent Application No. 10-2013-0055633, filed on May 16, 2013, the disclosure of which is incorporated herein by reference in its entirety.

BACKGROUND

1. Field

The present disclosure relates to techniques for providing a single-sign-on (SSO) service in a virtual desktop infrastructure (VDI) environment.

2. Discussion of Related Art

VDI involves a computing technology for building a virtual desktop environment on a server connected to a network, and allowing a user to perform operations within the virtual desktop by accessing a server through a thin client, or a zero client that only has some necessary devices such as an input device, for example, a keyboard, a mouse, etc., and a display, and the like. Since the VDI technology allows a user to use the same desktop environment regardless of his/her physical location and provides advantages in, e.g., ensuring security, the VDI is being used more frequently, especially in business work environments.

Meanwhile, single-sign-on (SSO) involves a technology for enabling automatic access to a plurality of services with only a single login process. For example, assume that three systems A, B and C should be accessed for work purposes. When the SSO technology is employed, a user may log in to only one of the systems to automatically access the remaining system as well. However, when the SSO technology is not employed, the user must enter an ID and password into each of the three systems.

Now, assume that a user accesses a virtual desktop in a VDI system through a client and logs into a target system (for example, an office work system) over the accessed virtual desktop. In this case, the user first has to log into the VDI service system using his/her client to access the virtual desktop, and then has to log in to the target system over the accessed virtual desktop. This is inconvenient for the user since two logins are required (i.e., it is a two-step process): the VDI service system login and the target system login.

Using SSO to combine the VDI service system login and the target system login might appear to be a way of avoiding the inconvenience. However, with the VDI service system login and the target system login performed at the user's in-use local terminal (or local desktop) and at the virtual desktop of the VDI service system, respectively, information is blocked from being exchanged between the local terminal (or local desktop) and the virtual desktop, except for information to enable exchanging keyboard input and screen output. Therefore, SSO does not present a solution in the conventional VDI service system since the conventional VDI service systems prevent the SSO functionality from working with both the VDI service system login and also the target system login.

SUMMARY

One or more exemplary embodiments may overcome the above disadvantage and/or other disadvantages not described above. However, it is understood that one or more exemplary embodiment are not required to overcome the disadvantage described above, and may not overcome any of the problems described above.

The present disclosure is directed to an approach to combining virtual desktop access in a VDI environment, and target system access within the virtual desktop, to enable a single login process on a local terminal (local desktop) of a user.

According to an exemplary embodiment, there is provided a system for single-sign-on (SSO) in a virtual desktop infrastructure (VDI) environment, the system including: a VDI service server configured to provide a virtual desktop environment, to a user terminal, responsive to a request from the user terminal; and a VDI authentication interworking gateway configured to: receive VDI environment information, of the user terminal, from the VDI service server, and carry out delegated user authentication for a target system in the virtual desktop environment using the received VDI environment information.

In an aspect of the exemplary embodiment, in the system, the VDI authentication interworking gateway is further configured to use, as the VDI environment information, at least one of: VDI account information of the user terminal, a local IP address of the user terminal, an IP address of a virtual desktop, a host name of the virtual desktop, a domain group to which the virtual desktop belongs, and hardware information of the user terminal.

In an aspect of the exemplary embodiment, in the system, the VDI authentication interworking gateway is further configured to: generate user authentication information using the received VDI environment information; and encrypt the generated authentication information to obtain encrypted authentication information; and transmit the encrypted authentication information to the target system.

In an aspect of the exemplary embodiment, in the system, the VDI authentication interworking gateway is further configured to: make a determination as to whether the target system is accessible via SSO, and generate the user authentication information when the determination indicates that the target system is accessible via the SSO.

In an aspect of the exemplary embodiment, in the system, the encrypted authentication information includes a generation time of the authentication information.

In an aspect of the exemplary embodiment, in the system, the VDI authentication interworking gateway is further configured to: firstly encrypt the generated authentication information using the generation time of the authentication information; secondly encrypt a character string including the firstly encrypted authentication information and the generation time, by using a predetermined encryption key, to obtain a secondly encrypted character string; and transmit the secondly encrypted character string to the target system.

In an aspect of the exemplary embodiment, in the system, the target system is configured to: decrypt the secondly encrypted character string using a predetermined decryption key to extract the firstly encrypted authentication information and the generation time; obtain the user authentication information from the firstly encrypted authentication information using the extracted generation time; and perform authentication for the user terminal, in the virtual desktop environment, using the obtained user authentication information and the VDI environment information obtained from the VDI service server.

In an aspect of the exemplary embodiment, in the system, the target system is further configured to determine that the authentication is unsuccessful when a difference, between the obtained generation time and a current time, falls outside of a predetermined range.

In an aspect of the exemplary embodiment, in the system, the target system is further configured to determine that the authentication is unsuccessful when the obtained user authentication information is different from the VDI environment information obtained from the VDI service server.

According to another exemplary embodiment, there is provided a method for single-sign-on (SSO) in a virtual desktop infrastructure (VDI) environment, the method including: using a VDI service server to provide a virtual desktop environment, to a user terminal, responsive to a request from the user terminal; and with a VDI authentication interworking gateway, receiving VDI environment information of the user terminal from the VDI service server, and carrying out delegated user authentication for a target system in the virtual desktop environment using the received VDI environment information.

In an aspect of the exemplary embodiment, in the method, the VDI environment information includes at least one of: VDI account information of the user terminal, a local IP address of the user terminal, an IP address of a virtual desktop, a host name of the virtual desktop, a domain group to which the virtual desktop belongs, and hardware information of the user terminal.

In an aspect of the exemplary embodiment, in the method, the carrying out of the delegated user authentication includes: generating user authentication information using the received VDI environment information; encrypting the generated authentication information to obtain encrypted authentication information; and transmitting the encrypted authentication information to the target system.

In an aspect of the exemplary embodiment, in the method, the carrying out of the delegated user authentication includes: making a determination as to whether the target system is accessible via SSO, and generating the user authentication information when the determination indicates that the target system is accessible via the SSO.

In an aspect of the exemplary embodiment, in the method, the encrypted authentication information includes a generation time of the authentication information.

In an aspect of the exemplary embodiment, in the method, the carrying out of the delegated user authentication comprises: firstly encrypting the generated authentication information using the generation time of the authentication information; secondly encrypting the firstly encrypted authentication information and the generation time by using a predetermined encryption key to obtain secondly encrypted authentication information; and transmitting the secondly encrypted authentication information and the generation time to the target system.

In an aspect of the exemplary embodiment, in the method, the target system: decrypts the secondly encrypted authentication information using a predetermined decryption key to extract the firstly encrypted authentication information and the generation time; obtains the user authentication information from the firstly encrypted authentication information using the extracted generation time; and performs authentication for the user terminal, in the virtual desktop environment, using the obtained user authentication information and the VDI environment information obtained from the VDI service server.

In an aspect of the exemplary embodiment, in the method, the target system determines that authentication is unsuccessful when a difference, between the obtained generation time and a current time, falls outside of a predetermined range.

In an aspect of the exemplary embodiment, in the method, the target system determines that authentication is unsuccessful when the obtained user authentication information is different from the VDI environment information obtained from the VDI service server.

BRIEF DESCRIPTION OF THE DRAWINGS

The above and other objects, features and advantages of the exemplary embodiments of the present disclosure will become more apparent to those familiar with this field from the following detailed description when taken in conjunction with the accompanying drawings, in which.

DETAILED DESCRIPTION OF EXEMPLARY EMBODIMENTS

Exemplary embodiments of the present disclosure will be described in detail below with reference to the accompanying drawings. While the present disclosure is shown and described in connection with exemplary embodiments thereof, it will be apparent to those familiar with this field that various modifications can be made without departing from the spirit and scope of the present disclosure. In addition, the description below omits a number of details already familiar to those in this field, to avoid obscuring the gist of the inventive concepts.

Figure 1:
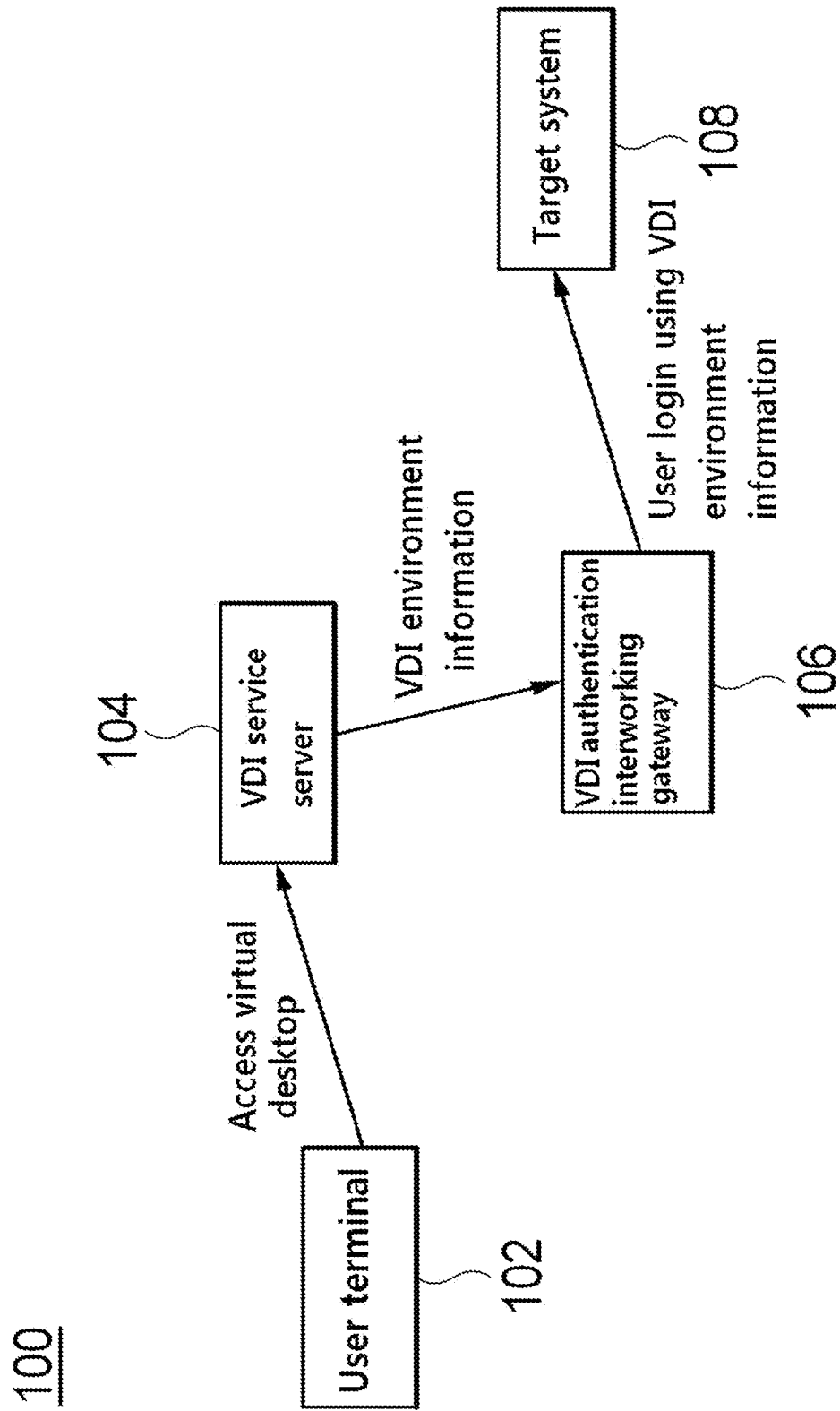
FIG. 1 is a block diagram illustrating a system 100 for single-sign-on (SSO) in a virtual desktop infrastructure (VDI) environment according to an exemplary embodiment of the present disclosure.

FIG. 1 is a block diagram illustrating a system 100 for single-sign-on (SSO) in a virtual desktop infrastructure (VDI) environment according to an exemplary embodiment of the present disclosure. As shown, the system 100 for SSO in the VDI environment according to an exemplary embodiment of the present disclosure includes a user terminal 102, a VDI service server 104, a VDI authentication interworking gateway 106 and a target system 108.

The user terminal 102 is a user device receiving a virtual desktop service by accessing the VDI service server 104 described below. The user terminal 102 may include all kinds of devices including appropriate input and output functionality for inputting and outputting data, and network access circuitry for accessing the VDI service server 104. For example, the user terminal 102 may include a personal computer such as a desktop computer, notebook computer, and so on, or a portable device such as a mobile communication terminal, a smart phone, a tablet, and so on.

The user terminal 102 may access the VDI service server 104 and perform authentication so as to receive a virtual desktop. At this time, for example, the authentication may be performed using an ID and a password input by a user, but the present disclosure is not limited to such a specific authentication method.

The VDI service server 104 provides a virtual desktop environment to the user terminal 102 according to a request from the user terminal 102. In addition, the VDI service server 104 provides VDI environment information to the VDI authentication interworking gateway 106 according to a request from the VDI authentication interworking gateway 106 described below. A specific composition of the VDI service server 104 will be described below with reference to FIG. 2.

The VDI authentication interworking gateway 106 receives the VDI environment information of the user terminal 102 from the VDI service server 104, and carries out delegated user authentication for the target system 108 in the virtual desktop environment to which the user terminal 102 is connected using the received VDI environment information.

The target system 108 is a system to which the user terminal 102 accessing the virtual desktop attempts to access in the virtual desktop. The kind or type of target system 108 is not limited in the present disclosure, and, for example, the target system 108 may be a company intranet system or a web portal for a company or some other specific group.

In the exemplary embodiment of the present disclosure, the target system 108 receives an authentication request from the user terminal 102, via the VDI authentication interworking gateway 106, and compares information in the received authentication request with the VDI environment information received by the target system 108 from the VDI service server 104, so as to determine whether to permit or block user access in the virtual desktop environment to which the user terminal 102 is connected. An example of a specific authentication process between the VDI authentication interworking gateway 106 and the target system 108 will be described below.

Figure 2:
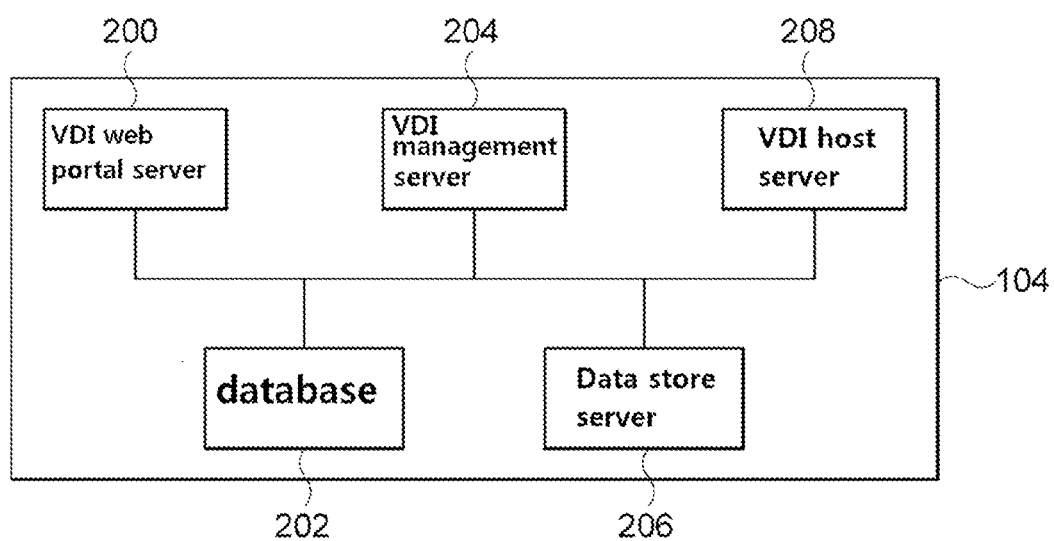
FIG. 2 is a block diagram illustrating a detailed composition of a VDI service server 104 according to an exemplary embodiment of the present disclosure.

FIG. 2 is a block diagram illustrating a more detailed composition of the VDI service server 104 according to an exemplary embodiment of the present disclosure. The composition of the VDI environment information shown here is merely an example, and a possible embodiment of the VDI service server 104 of the present disclosure is described below by way of example in illustration of the present disclosure. The VDI authentication interworking gateway 106 in the system 100 for SSO in the VDI environment may be configured to perform a login to the target system 108 by linking to any type of VDI service server. Therefore, the scope of the present disclosure should be understood to include all possible kinds of VDI service-providing systems in addition to the specific VDI service server 104 shown in FIG. 2.

As shown, the VDI service server 104 according to an exemplary embodiment of the present disclosure is composed of a server group including a VDI web portal server 200, a database 202, a VDI management server 204, a data store server 206 and a VDI host server 208.

The VDI web portal server 200 is a server accessed first by the user terminal 102 for receiving a VDI service. The VDI web portal server 200 may include a proper interface for access and authentication of the user terminal 102, and, for example, the interface may be composed in web page format.

The user terminal 102 may input information necessary for authentication of the user terminal 102 by accessing the VDI web portal server 200. At this time, for example, the information necessary for authentication may be a user ID/password. The VDI web portal server 200 compares the input information with information stored the database 202 to permit or block the access of the user terminal 102. For example, the database 202 may be composed of hardware equipment capable of performing the authentication and storing and managing the authentication information, such as Active Directory, Radius, Oracle DB, etc.

The database 202 is a space storing the information necessary for the authentication of the user terminal 102. As described above, the VDI web portal server 200 compares the received information with the information stored in the database 202 to authorize the user terminal 102, when the authentication request is received from the user terminal 102.

In addition, the database 202 stores and manages the VDI environment information of each of the user terminals 102. At this time, the VDI environment information may include at least one of the following: VDI account information, a local IP address of the user terminal 102, an IP address of the virtual desktop, a hostname of the virtual desktop, a domain group in which the virtual desktop is included, and hardware information of the user terminal 102. The local IP address of the user terminal 102 and the hardware information of the user terminal 102 of the VDI environment information may be obtained during the process of authenticating the user terminal 102. In addition, the hardware information may include any kind of information that can distinguish the user terminal 102 in terms of hardware, such as a central processing unit, memory specifications, or serial numbers of components of the user terminal 102.

The VDI management server 204 receives a virtual desktop generation request from the user terminal 102 with which access is established from the VDI web portal server 200, and provides the VDI environment information of the user terminal 102 stored in the database 202 to the VDI host server 208. In addition, the VDI management server 204 generates a virtual desktop image of the user terminal 102 and provides the generated virtual desktop image to the VDI host server 208. For this, the VDI management server 204 may include a desktop delivery controller (DDC) and a virtual machine (VM) manager for managing and providing the VDI environment information, and a provisioning server (PVS) for generating the virtual desktop image.

The data store server 206 stores and manages user data such as files, etc., used by the user terminal 102 in the virtual desktop. The data store server 206 provides the user data to the VDI host server 208 according to a request from the VDI host server 208.

The VDI host server 208 generates the virtual desktop using the VDI environment information and the virtual desktop image of the user terminal 102 received from the VDI management server 204, and the user data received from the data store server 206, and provides the generated virtual desktop to the user terminal 102. That is, the user terminal 102 performing the access by accessing the VDI web portal server 200 first uses the virtual desktop by accessing the VDI host server 208.

Figure 3:
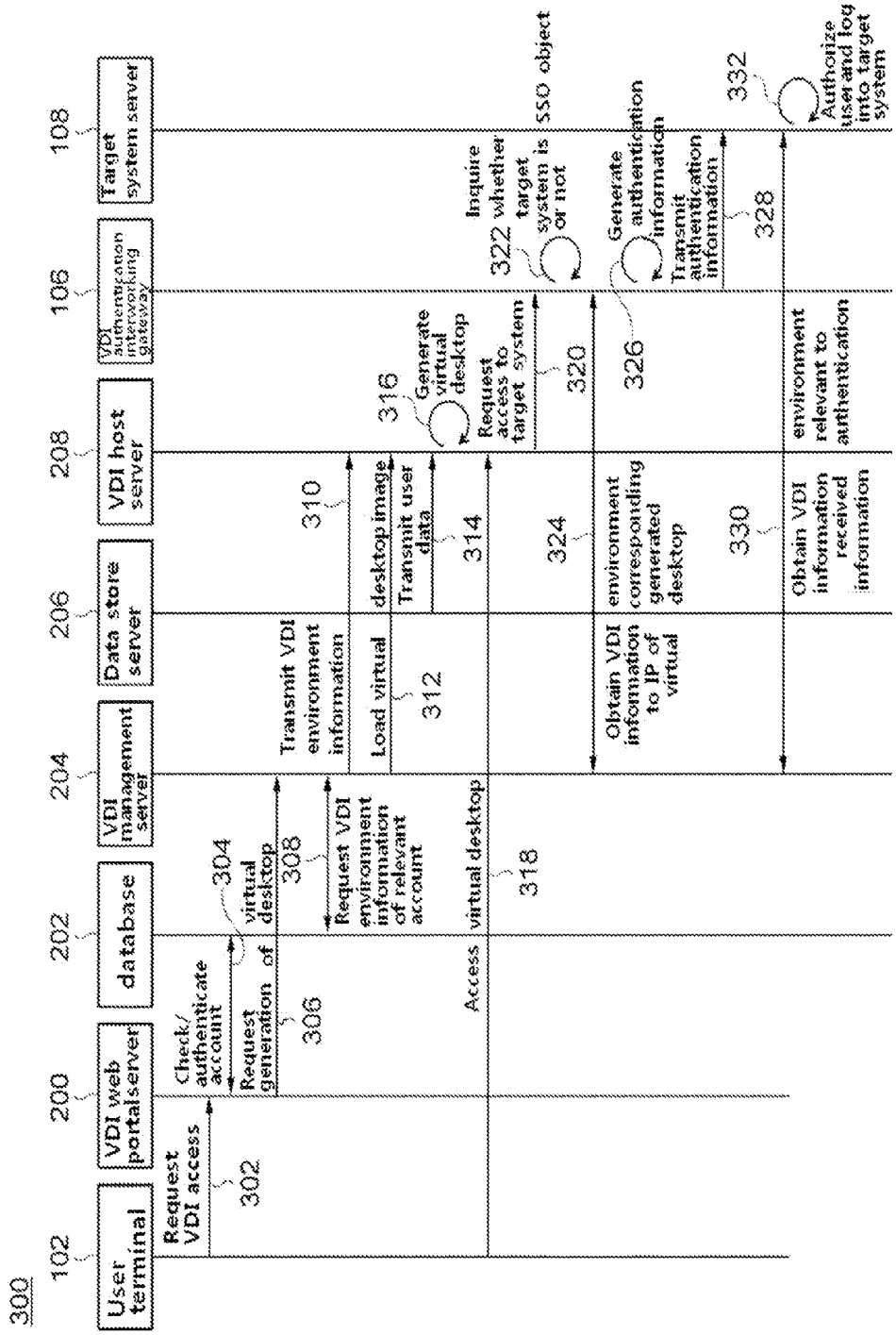
FIG. 3 is a flowchart for describing a method for SSO in a VDI environment according to an exemplary embodiment of the present disclosure.

FIG. 3 is a flowchart for describing a method for SSO in a VDI environment according to an exemplary embodiment of the present disclosure.

The user terminal 102 transmits the VDI access request to the VDI web portal server 200 so as to perform an operation by accessing the virtual desktop (302). As described above, the access request may include information (for example, ID/password) necessary for user authentication.

The VDI web portal server 200 receives (304) the VDI access request and compares the information in the received access request with the information stored in the database 202 to perform the user authentication. When the authentication is finished, the VDI web portal server 200 transmits (306) the virtual desktop generation request to the VDI management server 204.

Then, the VDI management server 204 requests (308) the VDI environment information of the user terminal 102 from the database 202 to obtain the VDI environment information. As described above, the VDI environment information may include at least one of the following: VDI account information, a local IP address of the user terminal 102, the IP address of the virtual desktop, the hostname of the virtual desktop, the domain group in which the virtual desktop is included, and hardware information of the user terminal 102. When the VDI environment information is obtained, the VDI management server 204 transmits the VDI environment information to the VDI host server 208 (310). In addition, the VDI management server 204 generates or loads (312) the virtual desktop image of the user terminal 102 and transmits the virtual desktop image to the VDI host server 208.

Meanwhile, the data store server 206 transmits (314) the user data of the user terminal 102 to the VDI host server 208. In the illustrated exemplary embodiment, steps 310, 312 and 314 are performed in sequence, but this is merely an example, and it is understood that these steps may be performed in some other order or simultaneously.

The VDI host server 208 generates, in step 316, the virtual desktop using the VDI environment information of the user terminal 102 received in step 310, the virtual desktop image received in step 312, and the user data received in step 314, and transmits the generated virtual desktop to the user terminal 102. Then, the user terminal 102 accesses (318) the generated virtual desktop.

When the user terminal 102 attempts to access the target system 108 in the virtual desktop, after having accessed the virtual desktop through the steps described above, the VDI authentication interworking gateway 106 receives the VDI environment information of the user terminal 102 from the VDI service server 104, and carries out delegated user authentication for the target system 108 in the virtual desktop environment using the received VDI environment information. A more detailed explanation of the foregoing is given below.

First, the VDI host server 208 transmits (320) the target system access request to the VDI authentication interworking gateway 106 after access of the user terminal 102 is established. In one exemplary embodiment, the VDI host server 208 may transmit the target system access request, upon request by the user terminal 102. In addition, in another exemplary embodiment, the VDI host server 208 may automatically transmit the access request to access the predetermined target system 108 to the VDI authentication interworking gateway 106 after the user terminal 102 establishes access to the virtual desktop.

The VDI authentication interworking gateway 106 receiving the access request first inquires (322) whether the target system 108 included in an access request is accessible via SSO. For example, the inquiry process may be performed with reference to an SSO object server list stored in the VDI authentication interworking gateway 106 or an additional database, etc. When the target system 108 is found not to be accessible via SSO as a result of the inquiry, the VDI authentication interworking gateway 106 informs the VDI host server 208 that SSO-type access is impossible.

On the other hand, when the target system 108 is determined to be accessible via SSO as the result of the inquiry, the VDI authentication interworking gateway 106 obtains (324) the VDI environment information of the user terminal 102 through the VDI management server 204. At this time, VDI authentication interworking gateway 106 may be configured to receive the VDI environment information corresponding to an IP of the virtual desktop using the IP of the generated virtual desktop. Then, the VDI authentication interworking gateway 106 generates (326) the authentication information for authentication of the user terminal using the obtained VDI environment information, and transmits (328) the generated authentication information to the target system 108. At this time, the VDI authentication interworking gateway 106 may transmit the authentication information by encrypting the authentication information, and may perform the encrypting, e.g., by adding the generation time of the authentication information to the generated authentication information. In addition, the VDI authentication interworking gateway 106 may transmit the encrypted authentication information to the target system 108 in a HTTPS (TCP443, SSL) method for safe transmission, and may use a variety of message transmission methods such as a GET method, a POST method, a Cookie on Memory method, and so on, according to the type of target system 108.

A more detailed example of the generation process of the encrypted authentication information is given below. First, the VDI authentication interworking gateway 106 generates the authentication information, for authentication of the user terminal 102, using at least one piece of the received VDI environment information of the user terminal 102. That is, the authentication information may be formed by combining information or using at least one piece of information included in the VDI environment information of the user terminal 102 that can distinguish the user terminal 102. For example, the VDI authentication interworking gateway 106 may combine the authentication information by combining the account information (ID) of the user terminal 102 with the IP address of the virtual desktop.

When the authentication information is generated, the VDI authentication interworking gateway 106 firstly encrypts the authentication information using generation time information of the authentication information as an encryption key, and secondly encrypts the encrypted character string and the generation time using a predetermined encryption key. This can be summarized as follows.

Firstly encrypting: [ID, virtual desktop IP]+key (generation time)

Secondly encrypting: [firstly encrypted message, generation time]+key (encryption key)

The above-mentioned encryption key and the decryption key described below may use a value previously determined between the VDI authentication interworking gateway 106 and the target system 108. In addition, in the exemplary embodiments of the present disclosure, the algorithm used in encrypting and decrypting is not limited, and any appropriate algorithm used in conventional variable encrypting and decrypting methods may be used.

When the second encryption is finished as described above, the VDI authentication interworking gateway 106 transmits the secondly encrypted message to the target system 108 through a security channel, or the like.

The target system 108 receives (330) the encrypted authentication information from the VDI authentication interworking gateway 106, and performs authentication (332) of the user terminal 102 in the virtual desktop using the encrypted authentication information.

In the example described above, when the target system 108 receives the secondly encrypted message from the VDI authentication interworking gateway 106, the target system 108 firstly decrypts the received secondly encrypted message using the predetermined decryption key. When the first decrypting is finished, a firstly encrypted message and the generation time information of the authentication information are extracted.

The target system 108 calculates a difference between the extracted generation time and current time (the time of decryption), and the target system 108 may determine that the authentication of the user terminal 102 is unsuccessful when the calculated difference falls outside of a predetermined range. For example, the target system 108 may determine that the authentication of the user terminal 102 is unsuccessful if the generation time falls outside of the following range.

−3 seconds<present time<+3 seconds

Vulnerability to external hacking and unauthorized intrusion may be minimized by setting the range, between the generation time of the authentication information at a transmitter terminal and the decryption time at a receiver terminal, as described above. The time range may be properly set in consideration of environmental variables such as performance, network status, time synchronization success or failure, and so on.

If the difference between the generation time and the current time falls within the predetermined range as a result of the calculation, the target system 108 secondly decrypts the firstly encrypted message using the generation time as a key. The target system 108 may obtain original authentication information (ID and IP address of the virtual desktop in the exemplary embodiment) as the result of the second decrypting. Then, the target system 108 obtains (330) the VDI environment information corresponding to the obtained authentication information from the VDI management server 204, and compares the authentication information with the VDI environment information received in step 330 to authenticate the user terminal 102 (332). That is, the target system 108 determines that the authentication of the user terminal 102 is successful when the received authentication information is the same as the information stored in the VDI management server 204, and determines that the authentication of the user terminal 102 is unsuccessful when the received authentication information is not the same as the information stored in the VDI management server 204.

As described above, according to the exemplary embodiments of the present disclosure, the VDI authentication interworking gateway 106 linked with the VDI service server 104 performs authentication of the target system 108, instead of the user terminal 102, after the user terminal 102 accesses the VDI service server 104. This advantageously enables the user to access the virtual desktop and login to the target system 108 with only one login: the login to the VDI service server 104.

Meanwhile, an exemplary embodiment of the present disclosure may include a computer-readable recording medium including a program for performing the method described in the specification on a computer. The computer-readable recording medium may include program instructions, local data files, local data structures, and so on, alone or in combination. The medium may be specially designed and configured for the present disclosure, or may be available a person of ordinary skill in computer software by the present disclosure. Examples of the computer-readable recording medium include a magnetic medium such as a hard disk, a floppy disk and a magnetic tape, an optical recording medium such as a CD-ROM and a DVD, a magnetic-optical medium such as a floptical disk, and a hardware device such as a ROM, a RAM, a flash memory, and so on, specially configured to store and execute program instructions. Examples of the program instructions may include machine codes made by a compiler, and high-level language codes executed on a computer using an interpreter, and so on.

It will be apparent to those familiar with this field that various modifications can be made to the above-described exemplary embodiments of the present disclosure without departing from the spirit or scope of the present disclosure. Thus, it is intended that the present disclosure covers all such modifications that fall within the scope of the appended claims and their equivalents.

What is claimed is:

1. A system for single-sign-on (SSO) in a virtual desktop infrastructure (VDI) environment, the system comprising:
   a VDI service server configured to provide a virtual desktop environment, to a user terminal, responsive to a request from the user terminal; and
   a VDI authentication interworking gateway configured to:
      receive VDI environment information, of the user terminal, from the VDI service server, and
      after an access from the user terminal to the VDI service server is established, carry out delegated user authentication for a target system in the virtual desktop environment using the received VDI environment information,
   wherein the VDI authentication interworking gateway is further configured to:
      generate user authentication information using the received VDI environment information; and
      encrypt the generated authentication information using a generation time of the authentication information to obtain encrypted authentication information; and
      transmit the encrypted authentication information to the target system.

2. The system of claim 1, wherein the VDI authentication interworking gateway is further configured to use, as the VDI environment information, at least one of: VDI account information of the user terminal, a local IP address of the user terminal, an IP address of a virtual desktop, a host name of the virtual desktop, a domain group to which the virtual desktop belongs, and hardware information of the user terminal.

3. The system of claim 1, wherein the VDI authentication interworking gateway is further configured to:
   make a determination as to whether the target system is accessible via SSO, and
   generate the user authentication information when the determination indicates that the target system is accessible via the SSO.

4. The system of claim 1, wherein the encrypted authentication information includes the generation time of the authentication information.

5. The system of claim 4, wherein the VDI authentication interworking gateway is further configured to:
   secondly encrypt a character string including the encrypted authentication information and the generation time, by using a predetermined encryption key, to obtain a secondly encrypted character string; and
   transmit the secondly encrypted character string to the target system.

6. The system of claim 5, wherein the target system is configured to:
   decrypt the secondly encrypted character string using a predetermined decryption key to extract the encrypted authentication information and the generation time;
   obtain the user authentication information from the encrypted authentication information using the extracted generation time; and
   perform authentication for the user terminal, in the virtual desktop environment, using the obtained user authentication information and the VDI environment information obtained from the VDI service server.

7. The system of claim 6, wherein the target system is further configured to determine that the authentication is unsuccessful when a difference, between the obtained generation time and a current time, falls outside of a predetermined range.

8. The system of claim 6, wherein the target system is further configured to determine that the authentication is unsuccessful when the obtained user authentication information is different from the VDI environment information obtained from the VDI service server.

9. A method for single-sign-on (SSO) in a virtual desktop infrastructure (VDI) environment, the method comprising:
using a VDI service server to provide a virtual desktop environment, to a user terminal, responsive to a request from the user terminal;
with a VDI authentication interworking gateway, receiving VDI environment information of the user terminal from the VDI service server; and
after an access from the user terminal to the VDI service server is established, carrying out delegated user authentication for a target system in the virtual desktop environment using the received VDI environment information,
wherein the carrying out of the delegated user authentication includes:
generating user authentication information using the received VDI environment information;
encrypting the generated authentication information using a generation time of the authentication information to obtain encrypted authentication information; and
transmitting the encrypted authentication information to the target system.

10. The method of claim 9, wherein the VDI environment information includes at least one of: VDI account information of the user terminal, a local IP address of the user terminal, an IP address of a virtual desktop, a host name of the virtual desktop, a domain group to which the virtual desktop belongs, and hardware information of the user terminal.

11. The method of claim 9, wherein the carrying out of the delegated user authentication includes:
making a determination as to whether the target system is accessible via SSO, and
generating the user authentication information when the determination indicates that the target system is accessible via the SSO.

12. The method of claim 9, wherein the encrypted authentication information includes the generation time of the authentication information.

13. The method of claim 12, wherein the carrying out of the delegated user authentication comprises:
secondly encrypting the encrypted authentication information and the generation time by using a predetermined encryption key to obtain secondly encrypted authentication information; and
transmitting the secondly encrypted authentication information and the generation time to the target system.

14. The method of claim 9, wherein the target system:
decrypts the secondly encrypted authentication information using a predetermined decryption key to extract the encrypted authentication information and the generation time;
obtains the user authentication information from the encrypted authentication information using the extracted generation time; and
performs authentication for the user terminal, in the virtual desktop environment, using the obtained user authentication information and the VDI environment information obtained from the VDI service server.

15. The method of claim 14, wherein the target system determines that authentication is unsuccessful when a difference, between the obtained generation time and a current time, falls outside of a predetermined range.

16. The method of claim 14, wherein the target system determines that authentication is unsuccessful when the obtained user authentication information is different from the VDI environment information obtained from the VDI service server.

17. A system for single-sign-on (SSO) in a virtual desktop infrastructure (VDI) environment, the system comprising:
a VDI service server configured to provide a virtual desktop environment, to a user terminal, responsive to a request from the user terminal; and
a VDI authentication interworking gateway configured to:
receive VDI environment information, of the user terminal, from the VDI service server, and
carry out delegated user authentication for a target system in the virtual desktop environment using the received VDI environment information,
wherein the VDI authentication interworking gateway is further configured to:
firstly encrypt the generated authentication information using the generation time of the authentication information;
secondly encrypt a character string including the firstly encrypted authentication information and the generation time, by using a predetermined encryption key, to obtain a secondly encrypted character string; and
transmit the secondly encrypted character string to the target system.

* * * * *